2,988,686
SYNCHRONIZING DEVICE AND METHOD
Jan Rydh Schnittger, Villagatan 5, and Frans Eric Ossian Östmar, Kapellvagen 49, both of Finspong, Sweden
Filed Nov. 28, 1958, Ser. No. 777,141
2 Claims. (Cl. 322—40)

The present invention relates to power-plants, and more particularly to power-plants including a synchronous electric generator connected to a power supply system for delivering energy thereto and some kind of prime mover therefor, and in which it is required that the generator in addition to delivering energy to the power supply system, shall be capable of operating as a synchronous condenser for phase compensation purpose. In such operation it would involve too great losses to allow the prime mover to rotate with the electric machine, and for this reason a disengaging clutch is inserted between the prime mover and the electric machine in order to allow disconnection of the prime mover when desired. In such operation of the electric machine with the prime mover disconnected, it may be desired to again connect the prime mover to the electric machine for active current generating purpose without the necessity of first bringing the electric machine to a still-stand. As far as low-power machines are concerned, this object can be realized by means of friction-clutches, but where high powers are concerned, the difference in rotational speed between the two machines cannot be eliminated by slippage because of the difficulty of providing clutches capable of withstanding the heavy strains occurring.

The present invention has for its object to provide improved means for effecting a synchronizing of the machines before coupling them together mechanically, as well as an improved method for carrying the coupling action into effect. It is to be noted, however, that the invention is not limited to the use of said improved means and method for the specific case above but is intended to cover the general use of them for synchronizing and coupling together machines, especially high-power machines.

One feature of the invention involves that the prime mover has directly connected thereto an auxiliary synchronous generator, preferably one the pull-out torque of which is great with relation to the size of this generator as far as short-duration-loading thereof is concerned, said auxiliary generator having for its purpose to effect an electrical interconnection via the power supply system of the auxiliary generator and prime mover unit with the power generator prior to a mechanical connection of the prime mover to the power generator. To this end the prime mover accelerates the auxiliary generator to a speed at which the latter can be connected synchronously to the power supply system.

Figure 1:
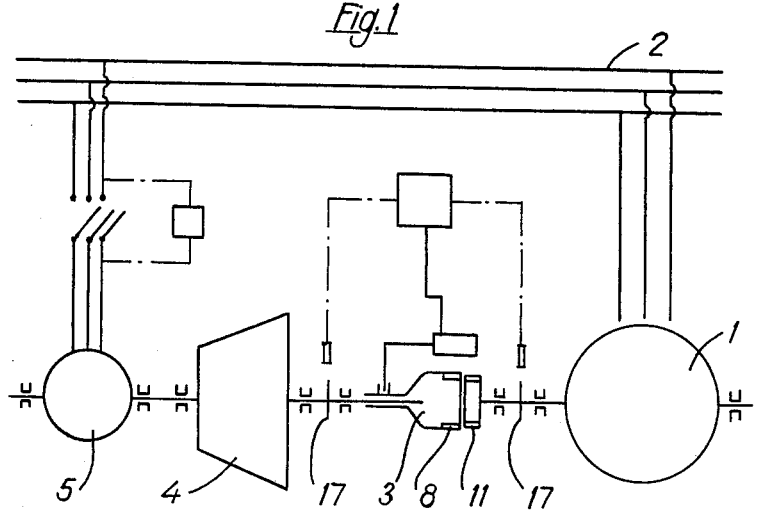
Figure 2:
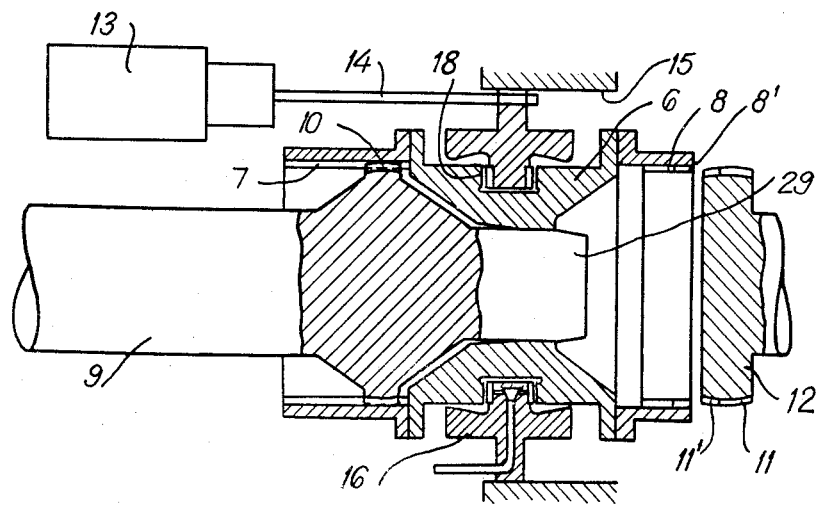

The invention is illustrated by way of example in the accompanying drawings, in which: FIG. 1 is a diagrammatic view of a power plant according to the invention. FIG. 2 is a longitudinal section of a clutch, FIGS. 3 to 6 are diagrammatic views showing a few teeth forming part of the clutch in different positions of operation, and FIG. 7 is a longitudinal section of a detail of FIG. 2.

Referring to FIG. 1, the numeral 1 designates a synchronous generator connected to a power supply system 2 for delivering energy thereto. By means of a jaw clutch 3 the generator 1 can be connected to a prime mover 4 comprising in the example shown a gas turbine. Mounted on the end of the gas turbine shaft remote from the power generator 1 is an auxiliary synchronous generator 5 having a pull-out torque which is great with relation to the size of this generator as far as short-duration loading thereof is concerned.

With the generator 1 operating as a synchronous condenser, the clutch 3 is in disengaged state, keeping the turbine 4 and the auxiliary generator 5 out of operation. When the machine 1 is to again operate as a generator, the turbine 4 has to be accelerated and coupled to said generator. This may be done by accelerating the auxiliary generator 5 and connecting it in synchronism to the power supply system 2. In this way the power generator 1 and the auxiliary generator 5 are electrically interlinked. Nevertheless it will not be possible to engage the jaw clutch 3 directly because of speed oscillations about the synchronous mean speed as determined by the line frequency of the power supply system. For this reason the clutch is designed for effecting the interconnection in stages.

To this end one clutch member is shaped as a sleeve 6, (FIG. 2) having inwardly projecting teeth 7 and 8 at its ends, respectively. Sleeve 6 may be axially displaced along the shaft 9 of turbine 4, shaft 9 to this end being provided with teeth 10 in mesh with the teeth 7 for transmitting a torque between said shaft and sleeve. The teeth 8 at the opposite end of sleeve 6 are adapted upon axial displacement of the sleeve to enter into engagement with teeth 11 formed on the clutch member 12 connected to the power generator 1. Said axial displacement is effected by means of a hydraulic servomotor 13 having a piston rod 14 connected to a ring 16 mounted to slide along a surface 15 and being in axial engagement with the side surfaces of an annular groove 18 formed in the peripheral surface of sleeve 6.

Figure 3:
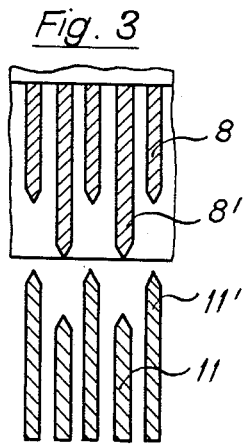
Figure 4:
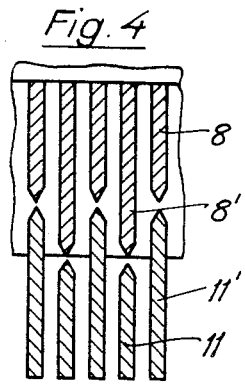
Figure 5:
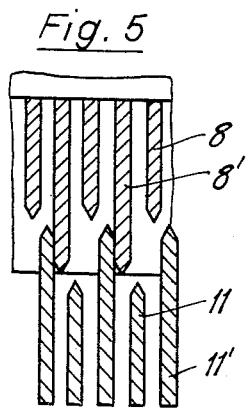
Figure 6:
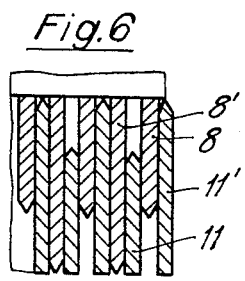
Figure 7:
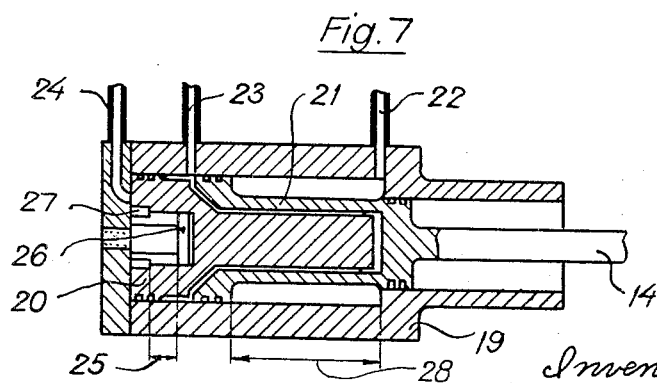

The interconnecting operation, as hereinbefore referred to, is effected in stages diagrammatically illustrated in FIGS. 3 through 6 in which a few teeth 8 and 11 of the respective members are shown in different positions of operation. Alternate teeth 8' and 11', respectively, are longer than the intervening ones and are axially extended towards the opposite clutch member. FIG. 3 shows the clutch in its disengaged state. After electrically interlinking the generators 1 and 5 in the manner already described, the relative positions of the clutch members are detected in a manner known per se by means of toothed wheels 17 (FIG. 1) on the shafts of the two clutch members. This being completed one clutch member is displaced towards the other by a sufficient amount to allow the portions of the longer teeth projecting beyond the ends of the shorter teeth and which are of a larger pitch ratio than the remainder of the teeth to enter into between each other, as shown in FIG. 4. The larger tooth pitch ratio enables this to be effected even if there should exist a certain instantaneous deviation from a common synchronous speed of the clutch members. By slightly increasing the driving torque of the gas turbine, which torque is still taken up completely by the generator 5, the pole angle is changed whereby the projecting end portion 8', 11' of the longer teeth are brought into engagement with each other, as shown in FIG. 5. In this state the clutch is capable of transmitting a driving torque of a certain magnitude. A still increased driving torque exerted by the gas turbine will result in the tooth flanks being positively forced against each other, thereby bringing the clutch into a position in which the last engagement stage may be carried out. Said stage consists in further displacing the first-mentioned clutch member in the axial direction so as to cause all the teeth to slide into engagement with each other until they occupy the finally engaged position shown in FIG. 6 in which the clutch is capable of transmitting the entire torque from the gas turbine 4 to the power generator 1.

As shown in the drawings, the extreme end surfaces of the teeth facing each other are pointed in order to facilitate their engaging movement.

In order to effect disengagement of the clutch members, the torque of the gas turbine is reduced, whereupon one clutch member is withdrawn from its engagement with the other member in a single stage.

In FIG. 7 is shown a constructional form of the servo-motor 13 which allows the stage-by-stage axial displacement. In a cylinder or housing 19 two pistons 20, 21 are reciprocably mounted in the disengaged state of the clutch the sleeve 6 (FIG. 2) is held against movement by supplying oil under pressure through a conduit 22, while conduits 23, 24 are connected to drain. To effect out the first stage of clutch engagement, oil under pressure is supplied through conduit 24, while conduit 23 is still connected to drain. Owing to the fact that the effective area of the piston 20 is larger than that of piston 21, the pistons will be displaced through a distance 25 to the right in the drawing for effecting the first engaging stage of the clutch by coating the extended end portions 8' and 11' of the longer teeth of the clutch members to enter into engagement with each other (FIGS. 4 and 5). Said displacement is limited by a piston-like stop member 26 fastened to the end wall of the housing 19 and engaging a boring in piston 20. Said piston is provided with lugs 27 projecting into said boring for cooperation with the stop member 26.

The second stage of engagement of the clutch is effected by supplying oil under pressure also through the conduit 23. This oil will penetrate into between the two pistons 20 and 21 and allowed to act on a larger area of piston 21 than that subjected to the oppositely acting oil admitted through conduit 20. As a result the piston 21 will be displaced to the right by a further distance 28, thereby bringing the teeth of the clutch into full engagement with each other (FIG. 6).

It is to be noted that before the clutch members are brought into engagement with each other the sleeve 6 (FIG. 2) is guided, in addition to its guidance by the co-engaging teeth 7 and 10, by a guide pin 29 formed centrally at the end of the shaft 9. Said pin engages an inner surface of sleeve 6, which as well as the pin itself chamfered in a manner to cause the guiding action to be completely interrupted after the clutch members reach their fully engaged state.

It is further to be noted that, instead of making every second tooth of the clutch members longer than the others, for instance, every third or every fourth tooth may be longer than the remaining teeth.

As indicated in FIG. 2 the teeth 11 of clutch member 12 may be suitably arched for centering purpose.

We claim:
1. A synchronizing device for power plants comprising in combination, an electric power supply system, a synchronous electric main generator electrically connected to said power supply system for delivering energy thereto, a prime mover for said generator, means for mechanically coupling said prime mover to said generator, an auxiliary synchronous generator permanently connected to said prime mover mechanically, said auxiliary generator having a pull-out torque which is great in relation to the size of the auxiliary generator as far as short-duration loading thereof is concerned, and an electrical connection including switching means between the auxiliary generator and said power supply system for electrically connecting the auxiliary generator to the main generator by way of the power supply system for bringing the auxiliary generator and the associated prime mover into synchronism with the main generator for allowing said main generator to be mechanically coupled to the prime mover without shock.

2. A synchronizing device for power plants comprising in combination, an electric power supply system, a synchronous main generator connected to said system for delivering electric energy thereto, a prime mover for said generator, including a gas turbine, an auxiliary synchronous generator permanently connected to said gas turbine mechanically, an electric connection between said auxiliary generator and said power system including switching means for selectively connecting the auxiliary generator to said system for bringing the auxiliary generator and the associated prime mover into synchronism with the main generator, and a jaw clutch for mechanically coupling the prime mover and the power generator together by steps, when said synchronism is obtained, the clutch to this end comprising two members engageable and disengageable by a mutual axial displacement, which members are formed with axially longer and shorter teeth arranged in a corresponding order so as to make the clutch of a type having two pitch ratios.

References Cited in the file of this patent

UNITED STATES PATENTS

| | | |
|---|---|---|
| Re. 21,837 | Alexander et al. | June 24, 1941 |
| 1,989,481 | Kerr | Jan. 29, 1935 |
| 2,375,785 | Goode et al. | May 15, 1945 |